United States Patent [19]

Fan

[11] Patent Number: 5,242,603

[45] Date of Patent: Sep. 7, 1993

[54] PROCESS FOR THE DISPOSAL OF WASTE

[75] Inventor: Liang-Tseng Fan, Manhattan, Kans.

[73] Assignee: Solidiwaste Technology, L.P., Manhattan, Kans.

[21] Appl. No.: 780,525

[22] Filed: Oct. 18, 1991

Related U.S. Application Data

[63] Continuation of Ser. No. 177,613, Apr. 5, 1988, abandoned.

[51] Int. Cl.⁵ .................... C02F 11/14; C04B 18/18
[52] U.S. Cl. ............................ 210/751; 106/724; 106/734; 405/128
[58] Field of Search ............ 210/751, 739, 743, 749, 210/765, 766, 770; 405/129, 128; 106/709, 724, 734, 728, 729

[56] References Cited

U.S. PATENT DOCUMENTS

| | | | |
|---|---|---|---|
| 4,018,679 | 4/1977 | Bölsing | 210/751 |
| 4,116,705 | 9/1978 | Chappell | 210/751 X |
| 4,124,405 | 11/1978 | Quiénot | 210/751 X |
| 4,142,912 | 3/1979 | Young | 210/751 X |
| 4,518,508 | 5/1985 | Conner | 210/751 |
| 4,687,373 | 8/1987 | Falk et al. | 210/751 X |
| 4,909,849 | 3/1990 | Funderburk | 210/751 |
| 4,931,192 | 6/1990 | Covington et al. | 210/751 |
| 4,952,242 | 8/1990 | Earp | 210/751 |

FOREIGN PATENT DOCUMENTS 2614848  10/1977  Fed. Rep. of Germany ...... 210/751

Primary Examiner—Thomas Wyse
Attorney, Agent, or Firm—Harrison & Egbert

[57] ABSTRACT

A process for treating waste by mixing the waste with a chemical reagent and a pozzolanic material. The chemical reagent includes a retarder that is a viscosity-altering reagent, and an accelerator.

21 Claims, No Drawings

PROCESS FOR THE DISPOSAL OF WASTE

This is a continuation of co-pending application Ser. No. 07/177,613 filed on Apr. 5, 1988, abandoned.

TECHNICAL FIELD

The present invention relates to the field of disposal of inorganic and organic waste including chemical waste and low-level and medium-level nuclear waste and, more particularly, to the field of disposal of waste via microencapsulation or solidification. Still more particularly, the present invention relates to the field of disposal of waste by reacting the waste with a chemical reagent and a pozzolanic material to form solids suitable for safe storage or disposal. The chemical reagent includes a retarder, such as glycerine or other viscosity-altering reagent or mixture containing them, and an accelerator.

BACKGROUND OF THE INVENTION

One of the biggest problems presently facing the industrial world is the disposal of waste that has been generated and is presently being generated by the various industries. Several techniques were developed in the past to solve the problem. One method involves the use of landfills where the waste is transported for disposal. The disadvantage of that method is that it requires the transportation of the waste to the landfill from areas that are very distant from such landfills, thereby making such disposal uneconomical and oftentimes hazardous to the populated areas through which such waste is transported. Another disadvantage is that in the landfill disposal the waste is merely covered and not permanently contained whereby the problem is passed on to future generations. Waste being disposed in landfills may seep through the ground to subterranean water streams and the waste could be returned to populated areas through the natural water streams. The Environmental Protection Agency has issued regulations prohibiting the prior practice of disposing of liquid waste in landfills and regulating the types of solid waste and solidified waste which can be disposed in certain landfills. Such regulations have made many prior art practices obsolete.

Another method used in the past for the disposal of waste has been chemical treatment. One disadvantage of such treatment is that it is not effective because most of the compounds present in waste, and especially hazardous waste, do not react chemically with other compounds to form non-hazardous compounds. Furthermore, even if the conversion to harmless compounds is possible, such process is uneconomical.

Incineration has also been used in the past as means for the disposal of waste. Incineration, however, is not effective in most applications. Furthermore, incineration processes result in the formation of other undesirable chemicals in the form of ash or gases emitted to the environment. Furthermore, incineration is a very costly process that requires highly sophisticated incineration equipment and requires the transportation of the waste to special locations for the incineration to be performed.

Another method that has been used in the past for disposal of waste has been the process of solidifying the waste by mixing it with sawdust, various pozzolanic materials and polymeric substances. One disadvantage of such methods is their inability to adequately solidify liquid or sludge-type waste. Another disadvantage is that several pozzolanic materials used in the past have not been shown to be effective because of their physical or chemical properties. Attempts, for example, in the past to solidify waste with Portland cement produced a solid product which was very permeable, porous, subject to leaching and deficient in mechanical strength. The use of other pozzolanic material having better physical properties for promoting the interaction of various compounds such as fly ash was also ineffective because such material possessed undesirable properties such as quick setting before the waste could be uniformly dispersed in such material. Although used as a bonding agent, polymers have not been shown to have successfully bonded most wastes and to be successful, large quantities of the polymer are required. Furthermore, the use of polymeric compounds to promote the solidification is also undesirable because many polymeric compounds themselves are complex and hazardous, the resulting waste compound is toxic and chemical attack, such as sulfate attack, is prompted by such polymers. Also, the resultant waste compound degenerates over time when polymers are used. Thus, such disposal is often not permanent.

The present invention overcomes the deficiencies of the prior methods by providing a unique chemical reagent and a unique process wherein such chemical reagent is mixed with the waste and highly active pozzolanic material to produce a solid product that is non-toxic, safe, strong, smaller in volume than the resultant waste products of previously used solidification processes, easily transportable and easily disposable in landfill or in readily available natural disposal sites such as salt domes and the like. Furthermore, the present invention discloses a chemical reagent and a process utilizing that reagent wherein a pozzolanic waste material is used effectively to dispose of other waste, thus simultaneously disposing of two wastes. The production of the chemical reagent and its application are very simple and economical.

These and other advantages and objectives of the present invention will become apparent from the following description.

SUMMARY OF THE INVENTION

Inorganic and organic waste including chemical and low-level and medium-level nuclear waste is solidified by mixing such waste with a chemical reagent and a pozzolanic material. The chemical reagent includes a retarder, which could be glycerine or other viscosity-altering reagents, and an accelerator, namely calcium chloride. The retarder prevents a flash set of the pozzolanic material and slows the setting process, whereas the accelerator promotes the solidification activity. The retarder further acts as a lubricant and improves the viscosity. The pozzolanic material may be not only pozzolanic material specifically manufactured for cementing operations, such as Portland cement, but also waste material produced in several industrial applications such as fly ash, kiln dust, and steel or lead baghouse dust. The solid waste material formed may be thereafter stored or disposed in natural storage places without affecting or harming the environment.

DETAILED DESCRIPTION OF THE INVENTION

According to the present invention, a chemical reagent has been developed having unique properties for the solidification of organic and inorganic waste, such as chemical waste, and low-level and medium-level nuclear wastes and the safe disposal thereof. The chemical reagent is mixed with the waste and the pozzolanic material to form a solid waste material. It is essential that the mixing and related steps be carried out simultaneously or in a particular sequence, hereinafter described, to accomplish the desired results.

The chemical reagent is primarily composed of a retarder and an aqueous solution of an accelerator compound. In the present invention, the retarder is glycerine, a well-known compound readily available in the market, or another viscosity altering reagent. The retarder may also be glycerine in combination with other viscosity-altering reagents. Other retarders can be used alone or in combination depending on their availability, economics and the properties of the waste. Although the glycerine is a suitable retarder and could be used alone or with other retarders in different compositions in the various applications in accordance with the present invention, it is preferred that glycerine be used in most applications because of its superior retarding and lubricating properties. The retarder prevents "flash" set and slows the setting and solidification of the pozzolanic material when mixed with water and waste. It is believed the retarder coats the particles of waste to slow solidification. The retardation of the solidification permits sufficient time to uniformly mix the pozzolanic material and waste to achieve a uniform encapsulation and bonding of the waste in the resultant waste product. Further, the slower set-up time produces a greater mechanical strength in the resultant waste product. The retarder further acts as a lubricant. As a lubricant, the retarder provides a lower viscosity and thus friction reducing properties to facilitate the mixing of the chemical reagent, the wastes and the pozzolanic material in the manner hereinafter described. The preferred accelerator compound is calcium chloride ($CaCl_2$) which promotes the setting process of the pozzolanic material. The chemical reagent may also include other solvents that remain neutral during the solidification process in question.

The chemical reagent is prepared by mixing an aqueous solution of calcium chloride with the retarder by well-known mixing techniques. The amount of calcium chloride present in the aqueous solution that serves as the start-up material for the chemical reagent may range from 15 percent by weight to saturation. The amount of retarder used in the chemical reagent depends on the retarding and viscosity properties desired, and on the properties of the waste being treated. If, for example, a longer set-up time is desired, the amount of retarder is increased whereby the resulting waste product is harder and stronger. In a typical application, the amount of retarder may range from 0.01 to 15 parts of retarder per 100 parts of reagent chemical in undiluted form. It should be understood that a person skilled in the art could vary the amount of retarder to conform with certain application requirements. The chemical reagent is a non-toxic, homogeneous solution that retains its homogeneity and stability for a long time. The reagent could be easily stored at temperatures ranging from $-40°$ F. to $95°$ F. and above. Because the retarder and accelerator compounds are inexpensive and because the mixing process is simple, the chemical reagent is also inexpensive.

Many different pozzolanic materials may be used, including fly ash produced in coal-fired power stations, including Class C type fly ash known for its high calcium content, and Class F type fly ash characterized by its high silica and aluminum oxides content; cement kiln dust; lime kiln dust characterized by a high calcium content; steel or lead baghouse dust; silica fume dust from the refractory industry; gypsum; and Portland cement. The majority of the pozzolanic material listed herein could be characterized as waste material. The use of such waste pozzolanic material is a unique feature of the present invention in that it utilizes pozzolanic wastes to dispose of other wastes, including chemical and low-level and medium-level radioactive waste described hereinafter. The choice of pozzolanic material used to practice the present invention would depend on the availability of such material in the particular location, the price of such material, the needs of the entity generating the waste, and the guidelines of the regulatory authorities. In certain areas of the United States of America for example, where fly ash is available in large quantities, fly ash would be used. In special circumstances the nature of the waste to be treated may require the use of pozzolanic materials with higher calcium content such as Portland cement or lime kiln dust to perform the cementation process.

In the present invention, the utilization of the chemical reagent described herein enables one to use a pozzolanic material having a large reactive surface, whereby the pozzolanic material reacts more readily with the waste and forms a resultant waste product which has a large density and small pores. It is preferable that the pozzolanic material used has small, uniform powder particulate components with a high content of calcium and other cementation elements. Fly ash, for example, is a pozzolanic material that is composed of very small, spherical, uniform particles. Accordingly, fly ash possesses a superior ability to absorb, react with, or entrap the constituents of hazardous waste. Fly ash, however, tends to set-up very quickly when mixed with water and waste. Therefore, its use without the chemical reagent of the present invention would not be practical. Furthermore, fly ash includes a relatively small amount of calcium, a material that contributes to the mechanical strength and bonding forces of the resultant waste product. Therefore, fly ash alone would not produce a solid waste-containing compound with great mechanical strength. The use of the present chemical reagent compensates for such deficiencies by providing calcium to enhance the mechanical strength of the resultant waste solid and the retarder to prevent the flash setting of the fly ash when it is mixed with water and the waste.

One very important aspect of the process disclosed by the present invention is the requirement that the mixing, blending and related steps be carried out simultaneously or in a specific sequence in order to obtain optimum results. The sequence of the steps depends on whether the organic or inorganic waste to be treated is a liquid or a solid waste. It should be understood that the term "solid waste" as used in the specifications and in the claims shall mean waste that includes less than about 15 percent of liquid in free form. Furthermore, "liquid waste" as used herein shall mean waste that includes more than about 15 percent of liquid in free form. If the waste is a liquid waste as defined herein, it is essential that the liquid waste be mixed first with the chemical reagent in a conventional mixer suitable for such mixing for a sufficient time to obtain a uniform distribution of the chemical reagent in the liquid waste. Following, the resultant mixture, comprising the liquid waste and the uniformly distributed chemical reagent, is blended or mixed with the pozzolanic powder material for sufficient time to obtain complete and uniform mixing. Following such mixing, the mixture is allowed to solidify to form waste solids. It may be desirable to pour the mixture into casting containers or molds to form the waste solids in predetermined shapes, such as blocks, for ultimate disposal.

It is preferred that the process for a liquid waste be performed in a continuous mixer. The continuous mode may be carried out by utilizing well-known mixing and blending equipment. For example, the mixing of the liquid waste with the chemical reagent may be carried out in a blending pump or in an in-line blender and the mixing of the resultant mixture and the fly ash may be carried out in a screw-type or a ribbon-type blender. Although it is preferred that the process for a liquid waste be carried out in a continuous mode, a batch mode may be utilized, particularly when only a relatively small amount of waste requires solidification. The process may be carried out in a central batch-type mixer.

If the waste to be treated is a solid waste as defined hereinabove, it is first mixed with the powder pozzolanic material until a uniform mixture is obtained. In a separate mixing tank, water is added to the chemical reagent to bring the chemical reagent to an optimum water content which is required for the treatment of the solid waste in question. Although various slump ratings may be desired depending upon the type of waste and its disposal, it is generally preferred that sufficient water be added to the solid waste to permit the resultant compound to be poured prior to solidification. Following, the chemical reagent is added to the uniform mixture comprising solid waste and pozzolanic material and mixed therewith for a sufficient period of time to obtain a uniform mixture. Following, the resultant mixture is allowed to solidify to form waste solids. It may be desirable to send the mixture for solidification to casting containers where it is allowed to form a molded solid. The treatment of solid waste may also be carried out effectively by carrying out the aforementioned steps simultaneously. The treatment of the solid waste may be carried out in either a batch or a continuous mode by utilizing well-known devices that are comparable to the devices used in the solidification of the liquid waste previously described.

Oftentimes certain preparatory steps are taken to prepare the waste prior to its mixing with the chemical reagent and the pozzolanic material to enhance the reactive interaction of the compounds and to obtain a better final solid waste product. One preparatory step is the neutralization of the waste, whether acidic or basic, by well-known neutralizing agents such as sodium, lime, etc. to obtain a preferred pH. Another preparatory step which is more applicable to solid waste and to liquid waste that contains solids is the grinding of the solid components of the waste to increase the surface area of the solids contained in the waste and to decrease the size of the solid material in the waste whereby better mixing with the pozzolanic material is achieved. Another preparatory step applicable in the treatment of solid waste containing liquid involves the drying of the solid waste prior to its mixing with the chemical reagent and pozzolanic material. The drying and the grinding of the waste may be carried out in well-known devices such as a rotary drier and grinder.

The process of the present invention may be utilized to treat a wide variety of organic and inorganic wastes, including chemical and low and medium-level nuclear waste, which are produced by industrial processes and other applications including, but not limited to, aromatic heavy oils and tars, creosote sludges tars, tank bottoms; petroleum heavy oils, tars and sludges; petrochemical heavy oils and tars and all by-products and tank residues including polymers; halogenated organic sludges containing PCBs, dioxins and other chlorinated solvent manufacturing tank bottoms; pesticide/herbicide sludges including arsenic; organic and inorganic sludges and wastes including leaded tank bottom cleanings; inorganic sludges, electroplating and metal finishing sludges and waste, chrome zinc, etc; contaminated soils, PCB and dioxin contaminated oil, tainted dirt and soils; waste gases adsorbed or entraped in solids or absorbed in liquids, and incinerator ash. The disposal of incinerator ash by the process of the present invention is of particular interest because it is a presently emerging need and the disposal or incineration of waste in solid form has not previously been performed.

As regards the utilization of the process disclosed by the present invention for the solidification and disposal of low-level and medium-level nuclear wastes, the process used is the same as the process for solidifying liquid wastes. It is preferred, however, to use a pozzolanic material of steel or lead baghouse dust containing high lead content to provide lead screening for the radiation emitting nuclear wastes.

Regarding the amount of chemical reagent and pozzolanic material utilized to treat various wastes, the amount depends on the kind of waste being treated and the particular requirements of the process. In typical applications, the amount of chemical reagent ranges from ¼ ounce to 2 ounces of chemical reagent per pound of waste material being treated and the amount of pozzolanic material ranges from 1.5 ounces to 2 pounds of pozzolanic materials per pound of waste material. In the treatment of liquid waste containing solids, the amount of pozzolanic material required decreases as the amount of suspended solids in the liquid waste increases. It is preferred that, before a waste is treated, laboratory tests be carried out with the particular waste to determine the optimum amounts of pozzolanic material and chemical reagent required.

In the process of the present invention, the chemical reagent, the pozzolanic material and the waste are cross-linked and bonded in the solidification process which changes the physical and chemical properties of the waste. The process reduces the coefficient of permeability, and the matrix plasticity index of the waste while it increases the mechanical internal strength into a load bearing mass upon solidification. The process provides a microencapsulation that surrounds and seals the portion of the matrix that is not chemically incorporated into the reaction, whereby the ingredients become microencapsulated in the interstices formed by the particles of pozzolanic material and virtually impermeable and essentially free of leaching. The reactions between the several components are thoroughly distributed over the particulate surfaces throughout the mass of the waste. Some waste material takes an active role in the process and functions as a chemical reagent on its own and further contributes to the physical hardening and reduction of permeability and leaching characteristics. The volume of the resultant waste product is smaller than the volume of the resultant product of the solidification processes previously used in the prior art.

The solids formed by the present process may be safely transported, and stored at various sites, such as landfills. One particular place for storing such waste solids is salt caverns that are located throughout the United States. Such storage may be accomplished by direct placement of the solids into the disposal site or by pumping the waste slurry prior to solidification down into a salt cavern where it is allowed to solidify by permanent storage.

The following examples further illustrate the invention but are not to be construed as limitations on the scope of the process contemplated herein.

EXAMPLE I

One-hundred (100) grams of acid sludge waste containing 7.50 percent by weight of solids was blended with ten (10) grams of chemical reagent containing 0.125 grams of glycerin, 0.125 grams of polyethylene glycol, and 9.7 grams of 39 percent calcium chloride solution in water, i.e. about 3.8 grams of calcium chloride and 5.9 grams of water. Following, one hundred (100) grams of lime dust was blended in the aforementioned mixture. The resultant mixture was poured into molds. The set time was approximately five hours and the final set time was ten (10) hours.

EXAMPLE II

One-hundred (100) grams of baghouse steel dust was blended with 15 grams of Portland cement. In a separate container, seven (7) parts of water (12.85 grams) were added to one (1) part of chemical reagent (2.65 grams) containing 0.03 grams of glycerine, 0.03 grams of polyethylene glycol, and 2.59 grams of 39 percent calcium chloride solution in water to form 15.5 grams of diluted chemical reagent. The chemical reagent was then added to a separately-formed blend of baghouse steel dust and Portland cement. The resultant mixture was allowed to solidify.

EXAMPLE III

The procedure of Example II was repeated utilizing fifty (50) grams of Class "C" fly ash instead of 15 grams of Portland cement.

EXAMPLE IV

One-hundred (100) grams of dry soil was mixed with fifty (50) grams of Class "C" fly ash. In a separate container, five parts (5) of water (13.5 grams) were added to one (1) part of chemical reagent (4.0 grams) containing 0.05 grams of glycerine, 0.05 grams of polyethylene glycol, and 3.9 grams of 39 percent calcium chloride solution in water to form 17.5 grams of diluted chemical reagent. Following, the diluted chemical reagent was added to the soil/fly ash blend and was allowed to solidify.

EXAMPLE V 17.5 grams of diluted chemical reagent was formed by adding two (2) parts of water (9.5 grams) to one (1) part of chemical reagent (8.0 grams) containing 0.11 grams of glycerine, 0.11 grams of polyethylene glycol, and 7.78 grams of 39 percent calcium chloride solution in water. Following, the diluted chemical reagent was mixed with one hundred (100) grams of wet soil. The resultant mixture was mixed with fifty (50) grams of Class C fly ash. The resultant mixture was allowed to solidify.

EXAMPLE VI

One-hundred (100) grams of sludge waste from an oil separator containing forty (40) percent by weight of solids was blended with 2.5 grams of chemical reagent containing 0.05 grams of glycerine, 0.05 grams of polyethylene glycol, and 2.4 grams of 39 percent calcium chloride solution in water. Following, one hundred (100) grams of Class "C" fly ash was added to the mixture and blended therewith.

EXAMPLE VII

The procedure of Example VI was repeated using five (5) grams of the same chemical reagent.

EXAMPLE VIII

One-hundred (100) grams of sludge from an oil separator containing sixty (60) percent by weight of solids was blended with 2.5 grams of the same chemical reagent used in Example VI. Following, sixty (60) grams of Class "C" fly ash was added and blended with the mixture.

EXAMPLE IX

The procedure of Example VIII was repeated using five (5) grams of the same chemical reagent.

EXAMPLE X

One-hundred grams of chrome plating waste containing 7.5 percent by weight of solids was blended with 2.5 grams of the same chemical reagent used in Example IX. Following, 75 grams of Class "C" fly ash was blended with the mixture and the resultant blend was allowed to solidify.

EXAMPLE XI

The procedure of Example X was repeated utilizing the same waste with 15 percent by weight of solids.

EXAMPLE XII

The procedure of Example X was repeated utilizing five (5) grams of chemical reagent.

EXAMPLE XIII

The procedure of Example XI was repeated utilizing five (5) grams of the same chemical reagent.

Although the invention is described with respect to specific embodiments and modifications, the details hereof are not to be construed as limitations except to the extent indicated in the following claims.

What is claimed is:

1. A process for treating hazardous inorganic and organic waste comprising the steps of:
    mixing a retarder with a calcium chloride accelerator to form a chemical reagent, said retarder being a chemical selected from the group consisting of: glycerine and polyethylene glycol; and
    blending said chemical reagent with the waste and a pozzolanic material.

2. A process according to claim 1 wherein the retarder is a viscosity-increasing reagent.

3. A process according to claim 1 further including the step of:
    solidifying the mixture of chemical reagent, waste, and pozzolanic material.

4. A process according to claim 1 wherein the blending step includes the simultaneous blending of the chemical reagent, the waste and the pozzolanic material.

5. A process according to claim 1 wherein the waste is a liquid waste.

6. A process according to claim 5, wherein said step of blending comprises:
mixing said chemical reagent with the waste; and
interacting the resultant mixture of said chemical reagent and waste with said pozzolanic material in a blending manner.

7. A process according to claim 6 wherein said step of mixing includes the step of:
distributing said chemical reagent throughout the waste in a uniform fashion.

8. A process according to claim 7 wherein said interacting step includes:
blending in a uniform manner said chemical reagent, said waste and said pozzolanic material.

9. A process according to claim 1 wherein the waste is a solid waste.

10. A process according to claim 9 further including the step of drying the solid waste prior to mixing the solid waste with the chemical reagent and the pozzolanic material.

11. A process according to claim 1 wherein said step of blending comprises:
mixing said waste with said pozzolanic materials; and
interacting said chemical reagent with the mixture of said waste and said pozzolanic material to form a blend.

12. A process according to claim 11 including the step of adding water to the chemical reagent prior to interacting the chemical reagent with the mixture of waste and pozzolanic material.

13. A process according to claim 12 further including the step of solidifying the blend of chemical reagent, waste and pozzolanic material.

14. A process according to claim 1 wherein the waste is nuclear waste.

15. A process according to claim 14 wherein the waste is low-level nuclear waste.

16. A process according to claim 14 wherein the waste is medium-level nuclear waste.

17. A process according to claim 1 wherein said retarder ranges from 0.01 to 15 parts per 100 parts of said chemical reagent.

18. A process according to claim 1 wherein the amount of pozzolanic material ranges from 1.5 ounces to 2 pounds of pozzolanic material per pound of waste material.

19. A process according to claim 1 wherein the amount of chemical reagent ranges from 0.25 ounces to 2 ounces of chemical reagent per pound of waste.

20. A process according to claim 1 further including the step of neutralizing the waste prior to blending the waste with the chemical reagent and the pozzolanic material.

21. A process according to claim 1 furter including the step of analyzing the waste prior to forming the chemical reagent and prior to blending the chemical reagent with the waste.

* * * * *

UNITED STATES PATENT AND TRADEMARK OFFICE
CERTIFICATE OF CORRECTION

PATENT NO. : 5,242,603
DATED      : Sep. 7, 1993
INVENTOR(S) : Liang-Tseng Fan [and Robin B. Somerville]

It is certified that error appears in the above—identified patent and that said Letters Patent is hereby corrected as shown below:

On title page, item [75] add the following:

--Robin B. Somerville, Galveston, Texas--

Signed and Sealed this

Third Day of May, 1994

Attest:

BRUCE LEHMAN

Attesting Officer     Commissioner of Patents and Trademarks